March 16, 1965 M. H. HALVERSON 3,173,709
DRAFT CONNECTION
Filed May 2, 1962
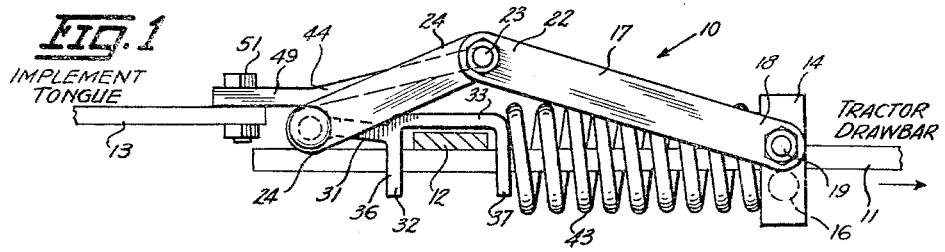
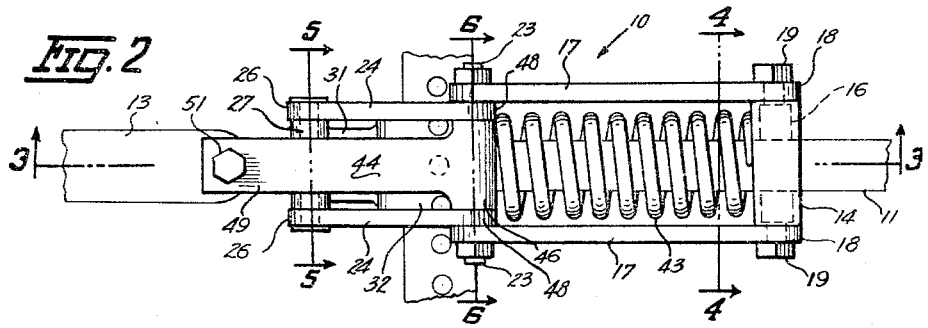
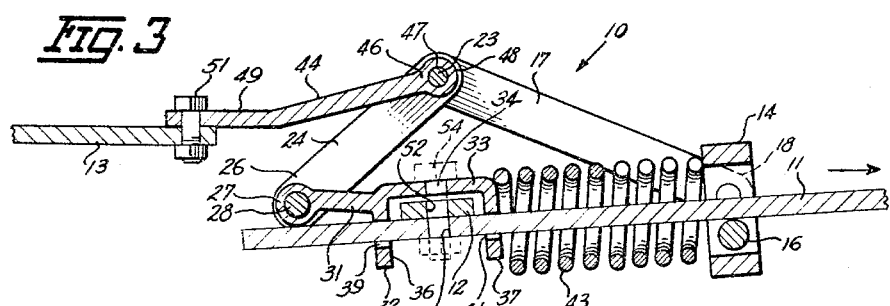
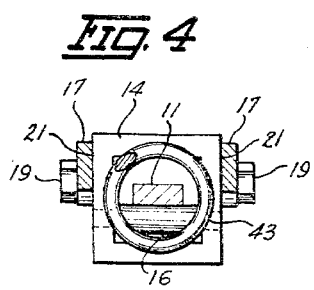
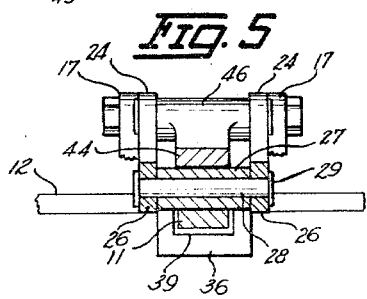
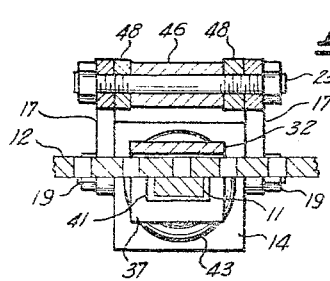
INVENTOR.
MYRON H. HALVERSON
BY
H. Robert Henderson
ATTORNEY.

United States Patent Office 3,173,709
Patented Mar. 16, 1965

3,173,709
DRAFT CONNECTION
Myron H. Halverson, 206 S. 8th St., Marshalltown, Iowa
Filed May 2, 1962, Ser. No. 191,785
7 Claims. (Cl. 280—446)

The present invention relates to draft connections such as are employed between a tractor and a farm implement or the like.

One object of the invention is to provide a draft connection which will function automatically to force the rear end of the tractor downwardly, whereby to compress the tires and obtain greater traction at the beginning of a heavy draft pull.

Another object of the invention is to provide a draft connection which will function automatically to compensate for the lowering of the tractor rear end at the beginning of a heavy draft pull, whereby to maintain the hitch connection at the most effective location.

Yet another object of the invention is to provide an automatic compensating draft connection readily adjustable as to the degree of compensation.

A further object of this invention is to provide a draft connection adapted for connection to the tractor drawbar and for slidable connection to the tractor quadrant for movement transversely of the tractor, the draft connection adapted to function automatically to vertically force apart the tractor drawbar and the hitch connection with the implement at the beginning of a heavy draft pull.

Yet another object of this invention is the provision of a structure capable of attaining the objectives stated hereinbefore, and which is economical, serviceable, and effective.

These objects and other features and advantages will become readily apparent upon reference to the following description and accompanying drawings, wherein:

FIG. 1 is a fragmentary side elevational view of the draft connection of this invention in assembled relation with a tractor drawbar and quadrant and with an implement tongue;

FIG. 2 is a top plan view of the structure of FIG. 1;

FIG. 3 is a longitudinal cross sectional view of the structure showing the relationship of the parts at the beginning of a heavy draft pull;

FIG. 4 is a cross sectional view as seen along the line 4—4 in FIG. 2;

FIG. 5 is a cross sectional view as seen along the line 5—5 in FIG. 2; and

FIG. 6 is a cross sectional view as seen along the line 6—6 in FIG. 2.

Referring now to the drawings, the improved draft connection of my invention is illustrated generally at 10 in FIG. 1 and is shown in assembled relation with a rearwardly extended drawbar 11 of a tractor or the like, a quadrant 12 or transverse draft bar, and a tongue 13 extended forwardly from an implement toward the tractor. The drawbar 11 is secured in a conventional manner for pivotal movement to the underside of the tractor adjacent the rear wheel drive mechanism, and the quadrant 12 is secured at each end (not shown) to the tractor frame.

The draft connection 10 of this invention comprises a square shaped block 14 (FIGS. 1 and 4) open at the center so as to receive the drawbar 11 therethrough, whereby the block 14 is slidably mounted on the drawbar. To eliminate friction between the drawbar 11 and the block 14, and to aid the stability of the block in a manner hereinafter described, a roller 16 (FIG. 4) is rotatably journaled within the open center of the block 14. The drawbar 11 is inserted through the block on top of the roller 16.

A pair of identical arms 17 are pivotally connected at their forward common ends 18 (FIGS. 1 and 2) by pivot bolts 19 to each side 21 (FIG. 4) of the block 14. The arms 17 extend rearwardly and upwardly in a parallel manner and in a straddling relationship to the drawbar 11. At their rear ends 22, the arms 17 are pivotally connected by a pivot shaft 23 to a pair of identical links 24 (FIGS. 1 and 2).

The links 24 extend rearwardly and downwardly of the pivot shaft 23 in a parallel manner and in a straddling relation to the drawbar 11 (FIG. 2). At their lower ends 26, the links 24 are interconnected by a sleeve 27 (FIG. 5), mounted for rotation about a shaft 28, the ends 29 of which are inserted through and connected to the links 24 by peening. The sleeve 27, in continued engagement with the drawbar 11, is integral with a rearward extension member 31 which in turn is integral with an inverted U-shaped bracket 32.

The bracket 32 includes a top piece 33 having an opening 34 formed therein, and a pair of legs 36 and 37. The legs are of a width (see FIG. 5) greater than that of the drawbar 11 so that by the provision therein of a pair of aligned slots 39 and 41 (FIG. 3), the drawbar 11 is slidably inserted through the bracket 32 (FIG. 6). To continually urge the block 14 forwardly of and apart from the bracket 32, a coil spring 43 is inserted about the drawbar 11 and placed between the bracket 32 and the block 14.

The draft connection 10 is completed by the provision of a T-shaped hitch member 44 (FIGS. 1 and 5). The T-shaped end 46 of the hitch member 44 has a bore 47 (FIG. 3) formed therein for receiving the pivot shaft 23, and is of a width to properly space and abut the upper ends 48 of the links 24. The stem portion 49 (FIG. 1) of the hitch member 44 extends rearwardly from the pivot shaft 23 and is adapted for connection by a hitch pin 51 to the implement tongue 13.

It is noted in the embodiment that the bracket legs 36 and 37 are placed in front of and directly behind the quadrant 12, and that openings 52 and 53 provided respectively in the quadrant 12 and the drawbar 11 can be aligned with the bracket opening 34. For proper operation of the draft connection, it is necessary for the bracket 32 to be attached to either the drawbar 11 or to the quadrant 12. If the quadrant 12 is not present, a fastening device 54 must be used to secure the bracket 32 to the drawbar 11.

However, if the quadrant 12 is present, the fastening device 54 is not necessary as the bracket 32 is prevented from movement longitudinally of the drawbar 11 by means of the quadrant 12. Furthermore, by providing sufficient clearance between the quadrant 12 and the bracket legs 36 and 37, it can be readily seen that the draft connection 10 and drawbar 11 can be moved as a unit transversely of and relative to the quadrant 12.

In operation of the draft connection, movement of the tractor forward and in a direction of the arrow in FIG. 1 results in the drawbar 11 and the quadrant 12 moving toward the right as viewed in FIG. 1. The draft force is transmitted through the hitch member 44 and the arms 17 to the block 14. Under a relatively light or normal load, the tension of the spring 43 will tend to hold the block 14 in its FIG. 1 position, and thus all elements illustrated in FIG. 1 maintain their relative positions.

However, when and as the draft pull increases, the spring 43 begins to yield and compress, thus allowing the block 14 to move rearwardly and toward the longitudinally stationary bracket 32. As the block 14 is pulled rearwardly, the like rearward movement of the arms 17 tends to force the links 24 also rearwardly. This action is resisted by the bracket 32 in that the lower ends 26 of the links 24, and the sleeve 27 are held longitudinally stationary relative to the drawbar 11. Thus, as the draft pull tends to force the hitch member 44 and the arms 17 into a straight line alignment, the result is a downward pressure via the links 24 by the sleeve 27 against the drawbar 11.

It is now apparent that as the draft resistance increases, the spring 43 continues to yield and the block 14 continues to move toward the bracket 32. The draft pull continues to pull the joint, namely the pivot shaft 23, between the arms 17 and the hitch member rearwardly, thus causing a counterclockwise movement of the links 24, as viewed in FIG. 3, about the sleeve 27. Thus, continued draft pull increase results in a vertical separation of the hitch pin 51 from the drawbar 11, wherein the drawbar 11 and thus the rear end of the tractor are forced downwardly toward the ground surface.

Due therefore to the capability of the rear tires of the tractor to flatten out and squash, it may be readily appreciated that greater traction of the rear tires is obtained. If the implement tongue 13 and hitch pin 51 were to be lowered with the drawbar 11, the tendency for the tractor front end to raise off the ground would be greatly increased. Therefore, a concomitant advantage is provided by maintaining the hitch pin 51 at substantially its original height, the lowering of the drawbar 11 being compensated for.

Some changes may be made in the construction and arrangement of my draft connection without departing from the real spirit and purpose of my invention, and it is my intention to cover by my claims, any modified forms of structure or use of mechanical equivalents which may be reasonably included within their scope.

I claim:

1. A draft connection between a tractor drawbar and an implement or the like comprising:
    two pivotally connected members for transmitting the draft extended above the drawbar, the implement being coupled to one of said members and the other of said members slideably connected to the drawbar; and
    means pivotally connected to the pivotal connection between said members and fixedly connected to the drawbar, said members responsive to the draft load for causing pivotal movement of said members and forcing the pivotal connection upwardly relative to the drawbar.

2. A draft connection between a tractor drawbar and an implement or the like comprising:
    two pivotally connected members for transmitting the draft, the implement being coupled to one of said members and the other member slidably connected to the drawbar;
    means pivotally connected to said members at the pivot and fixedly connected to said drawbar; and
    means engaged with said pivotally connected means and with said other member at the slidable connection for forcing said pivotally connected means and said other member apart.

3. A draft connection between a tractor drawbar and an implement or the like comprising:
    two pivotally connected members for transmitting the draft, the implement being coupled to one of said members and the other member slidably connected to the drawbar;
    means pivotally connected to said members at the pivot and fixedly connected to said drawbar; and
    resilient means connected between the other of said members, at the connection thereof with said drawbar, and said pivotally connected means, for forcing said pivotally connected means and said other member apart.

4. A draft connection between a tractor drawbar and an implement or the like comprising:
    a block slidably mounted on the drawbar;
    a pair of members connected at a pivot for transmitting the draft, one of said members pivotally connected at a free end to said block, and the implement coupled to the free end of the other of said members;
    link means pivotally connected to said pivot and adapted to bear downwardly toward said drawbar;
    bracket means connected to said drawbar and secured against longitudinal movement thereon, said bracket means pivotally connected to said link means; and
    means extended between and normally biasing said block and said bracket means apart.

5. A draft connection between a tractor drawbar and an implement or the like comprising:
    a block slidably mounted on the drawbar;
    a pair of parallel arms pivotally connected at common ends to said block and extended rearwardly therefrom and away from the tractor in a straddling manner relative to said drawbar;
    a pair of parallel links pivotally connected at common ends to the free ends of said arms above said drawbar, said links extended rearwardly toward said drawbar in a straddling manner relative thereto;
    a tongue member pivotally connected to said links and said arms at the pivotal connection therebetween and extended rearwardly above said drawbar for connection to said implement;
    a bracket pivotally connected to the free ends of said links and engaged with said drawbar, said bracket longitudinally immovable relative to said drawbar; and
    resilient means extended between and adapted to normally bias said bracket and said block apart.

6. A draft connection between a tractor drawbar and an implement or the like comprising:
    a block slidably mounted on the drawbar;
    a pair of parallel arms pivotally connected at common ends to said block and extended rearwardly therefrom and away from the tractor in a straddling manner relative to said drawbar;
    a pair of parallel links pivotally connected at common ends to the free ends of said arms above said drawbar, said links extended rearwardly toward said drawbar in a straddling manner relative thereto;
    a tongue member pivotally connected to said links and said arms at the pivotal connection therebetween and extended rearwardly above said drawbar for connection to said implement;
    a bracket pivotally connected to the free ends of said links and engaged with said drawbar, said bracket longitudinally immovable relative to said drawbar; and
    resilient means including a coil spring encircling said drawbar and extended between said bracket and said block whereby to bias said bracket and said block apart.

7. A draft connection between a tractor drawbar and an implement or the like wherein the drawbar extends rearwardly from the tractor at substantially right angles to a quadrant attached to the tractor, the draft connection comprising:
    a block slidably mounted on the drawbar forwardly of the quadrant;
    a pair of members connected at a pivot for transmitting the draft, one of said members pivotally connected at a free end to said block, and the implement coupled to the free end of the other of said members;

link means pivotally connected to said pivot and adapted to bear downwardly toward said drawbar;

bracket means pivotally connected to said link means, said bracket means slidably mounted on said drawbar and adapted to be engaged by and to move with said quadrant upon movement thereof, said quadrant operable to prevent longitudinal movement of said bracket means relative to said drawbar, and means extended between and normally biasing said block and said bracket means apart.

References Cited by the Examiner

UNITED STATES PATENTS

| | | | |
|---|---|---|---|
| 2,540,677 | 2/51 | Kandt et al. | 280—486 |
| 2,959,427 | 11/60 | Keese | 280—405 |

FOREIGN PATENTS 494,052   3/30   Germany.

A. HARRY LEVY, *Primary Examiner.*